United States Patent [19]

Tarbox

[11] Patent Number: 4,603,476

[45] Date of Patent: Aug. 5, 1986

[54] METHOD FOR HANDLING HARNESS WIRE

[76] Inventor: John W. Tarbox, 13096 Caminito Del Rocio, Del Mar, Calif. 92014

[21] Appl. No.: 587,455

[22] Filed: Mar. 8, 1984

[51] Int. Cl.[4] ........................ H01R 43/04; B21F 3/00; B23C 1/00

[52] U.S. Cl. ........................................ 29/863; 29/565; 29/593; 140/92.1; 242/100.1; 414/786

[58] Field of Search .................... 29/863, 33 F, 564.6, 29/56.6, 593; 241/25 R; 140/93 R, 92.2, 92.1; 81/9.51; 242/107.2, 100.1

[56] References Cited

U.S. PATENT DOCUMENTS

| | | | |
|---|---|---|---|
| 2,696,656 | 12/1954 | Madden | 81/9.51 X |
| 3,699,630 | 10/1972 | Tarbox et al. | 29/56.6 |
| 3,907,007 | 9/1975 | Hobbs et al. | 140/93 |
| 3,930,524 | 1/1976 | Tarbox | 29/56.6 X |
| 4,030,527 | 6/1977 | Roch | 140/93 R X |

*Primary Examiner*—Howard N. Goldberg
*Assistant Examiner*—Carl J. Arbes
*Attorney, Agent, or Firm*—Ralph S. Branscomb

[57] ABSTRACT

A special cartridge is provided which is used in wire harness making applications. The cartridge is loaded with a single length of wire which has been pre-cut to the desired length and also marked for identification with an ink jet sprayer, or other wire marking device, prior to being wound on the spool in the cartridge.

Once the wire is thus wound, it may sequentially be passed through a curing oven to dry the inked coding on the wire. Then the cartridge is engaged by an end effector on an articulated robot which passes both the leading end and the trailing end of the wire into selected wire strippers, crimpers, and a wire tester.

Once the wire reaches this point it is now wound on the reel in the cartridge with the proper terminals crimped on both ends. The cartridge may now be carried by the robot through a programmed path which first, inserts the wire extending out of the pay-out tube into a wire gripper on the formboard; second, pays out the now-gripped wire around the forming pins of the formboard and finally, runs the wire into a trailing end wire gripper. If production requirements call for parallel, as opposed to sequential operation, the cartridge may be transferred, by parking and re-picking, to a second robot at any logical step in the sequence.

6 Claims, 21 Drawing Figures

FIG. 15
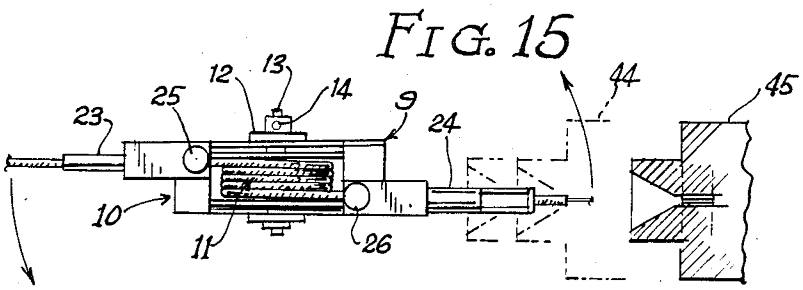
FIG. 16
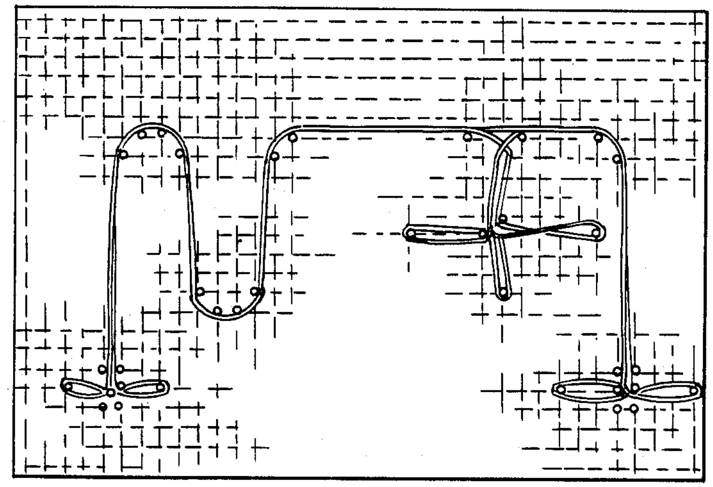
FIG. 17
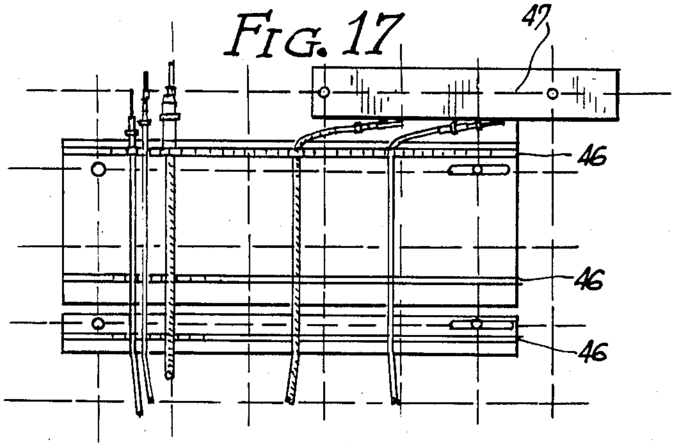
FIG. 18
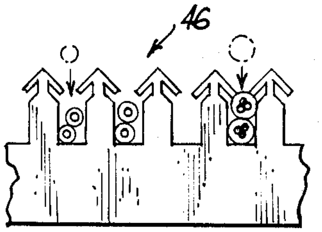
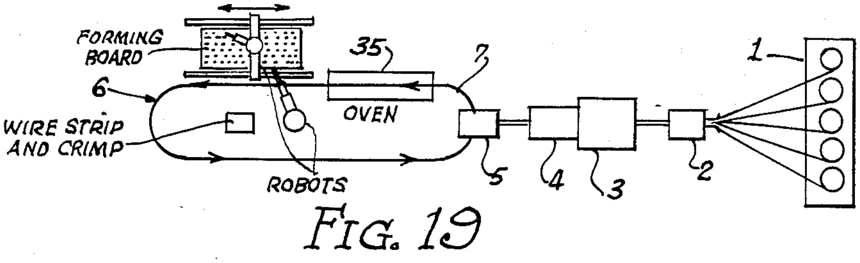
FIG. 19

METHOD FOR HANDLING HARNESS WIRE

BACKGROUND OF THE INVENTION

Electrical wire harnesses are assemblies of conductors found in nearly all equipment involving electrically energized devices. In today's world, virtually every kind of airplane, appliance, X-ray device, yacht, ship, and piece of heavy equipment has an electrical nervous or power system which requires a harness.

The harnesses range in complexity from a simple harness for a household appliance to the extremely complicated harnesses used in airliners, jet fighters and other military aircraft, having many miles of wire, and scores of different kinds of wires arranged in hundreds of different subcircuits.

Another important parameter that plays into the harness making business is the number of identical harnesses to be made in a single run. Clearly it is much more practical to set up an automated facility for manufacturing a refrigerator/freezer wiring harness which is rather simple to start with and will be made in the hundreds of thousands, than to set up an automated facility to produce several hundred extremely complicated harnesses for a jet fighter.

Steps to automate the harness-making process have been tried for years, but success has been restricted to limited applications. A body of technology capable of economically manufacturing harnesses through the use of computers, robotics, and other automation techniques, does not yet exist to handle the wide variety of harness-making tasks necessitated by modern technology. However, with the continuing advancements of the state of the art in the fields of robotics and computer control of machine systems, increasing opportunities exist to apply these technologies successfully to a wide range of harness-making applications.

The inventor of the herein disclosed invention has also developed a universal form board assembly which can be adapted to form virtually any wire harness, virtually irrespective of the size of the harness, as the form board system is modular. He has also developed, among other related inventions, a system and a technology for easily engaging and identifying the beginning and terminating portions of a wire in a harness, and automatically identifying, at all of the breakout points along the harness, both the source and the destination of the wire entering and exiting the breakout.

Through the instant disclosure, the inventor provides another automated step in the sequence of producing, through automation technology, wiring harnesses of virtually any kind. The final result of this pursuit will be the capability of producing any wiring harness within a certain range of parameters by the manipulation of a data base.

SUMMARY OF THE INVENTION

The instant invention comprises a free-standing cartridge which is loaded with a pre-selected length and type of wire for a specific run on the form board. Essentially, the cartridge comprises two half-shells which together define a housing for the within-contained wire spool, that is, the spool on which the wire is wound. The spool and both of the half-shells which define the housing are mutually freely rotatable about a common axis except when a locking pin locks the two half-shells together in their home position, such that only the spool is free to rotate.

Each of the half-shells mounts an outwardly directed tube through which one end of the wire passes. One tube is the trailing end tube, and the other is the pay-out tube, so-named because of their actions when the wire is actually being laid out on a formboard. Just inside of each tube is a magnetically operated wire gripper. When the wire is loaded, it is inserted through the pay-out tube and then directly into the trailing end tube, where the wire gripper engages the wire with about two inches projecting out of the trailing end tube. The half-shell which mounts the trailing end tube is now rotated by a rotating member in the loading device, with the rotation causing the wire to wind up on the free-wheeling reel inside the cartridge housing. The winding action continues until a sensor determines that the trailing end of the in-loading wire has come to within about two inches of the pay-out tube, at which point the winding action stops, and is briefly reversed until the two half-shells reach the home position, and the locking pin locks the two half-shells together.

The pre-marked coding on the wire would ordinarily be in the form of inked numerals sprayed on just prior to winding the wire on the spool. The ink does not have time to completely cure before it is wound on the spool.

The cartridge is now loaded, with about two inches of free wire extending out of each end, and it subsequently passes through several steps in the wire harness forming process.

The cartridge is first passed through an oven where it is cured, and then to a robot which picks it from the conveyor and presents it to termination devices where the leading and trailing ends of the wire are stripped, provided with crimped-on terminals and the whole wire segment is then tested for continuity and terminal integrity.

Figure 6:
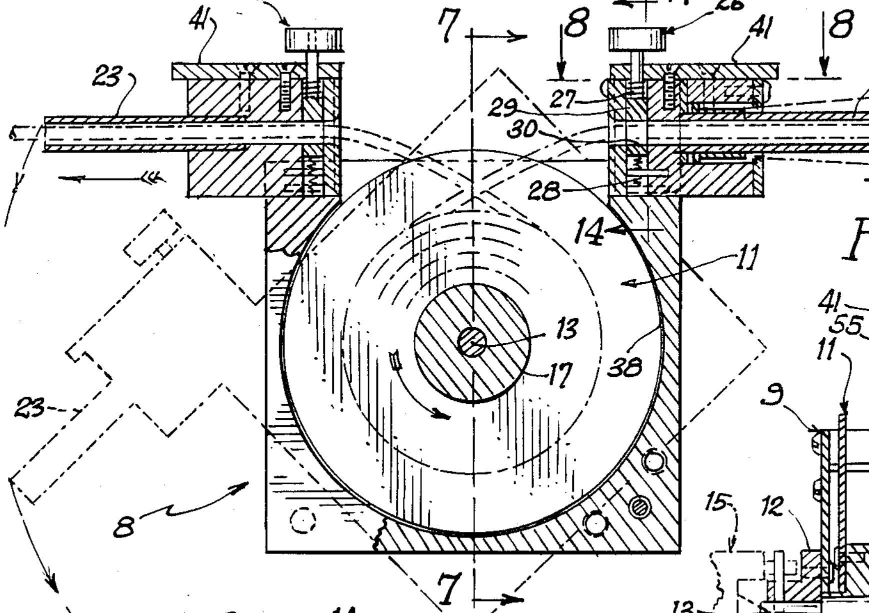
FIG. 6 is a section taken along line 6—6 of FIG. 4.
Figure 14:
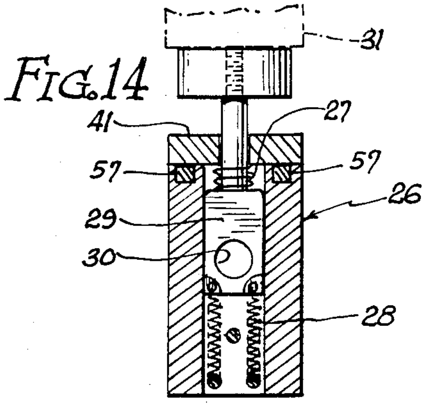
Figure 13A:
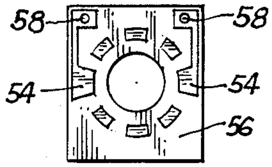
Figure 13B:
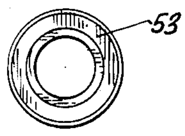

FIGS. **12*a* and 12*b*** illustrate the closed and open switch positions of the sensor actuated by the pay-out tube deflection;

FIGS. **13*a* and 13*b*** illustrated in plan view the fixed and movable switch elements of the pay-out tube sensor switch;

FIG. 14 is a section taken along line 14—14 of FIG. 6;

FIG. 15 is a top plan view of the cartridge with the end effector removed, stripping and terminating the wire ends;

FIG. 16 illustrates a form board demonstration lay-out;

FIG. 17 illustrates the engaging of the finished ends of the wires in a typical harness arrangement;

FIG. 18 illustrates in elevation the way in which the wires are gripped between teeth of a Cuecomb TM ; and, FIG. 19 illustrates in perspective the overall process whereupon different styles of wire provided in spool form are transformed into a wiring harness.

DETAILED DESCRIPTION OF THE PREFERRED EMBODIMENT

To better understand the invention, it is advisable to be aware of the environment in which the cartridge is used. Turning to FIG. 19, an automated wiring harness setup is illustrated which takes the wire from the bulk form supplied on a large spool all the way through to the point where they are deployed in a wiring harness, properly terminated and laid out.

The wire spools or reels begin the harness-forming process from a wire supply rack 1. A multiplicity of different thicknesses and styles of wires are ordinarily required to make a harness. These wires may include wiring having several strands of wires in a single sheathing, or two or more wires twisted together to be laid out as a single line, as well as monofilaments. All of the wires that are necessary for the harness are represented in the wire supply 1, and feed into the wire splicer 2. It is the purpose of the wire splicer to splice the tail end of the finished reel of wire to the lead end of a fresh reel so that the wire in essence is infinite in length.

From the wire splicer the wires are into an apparatus 3 which includes the ink jet marker and the controller, and a cutter which cuts the wire to the proper length after it has been marked. The entire system is computer-controlled, will individually select the style of wire from the variety available in the wire supply 1, mark it with the appropriate code number, and cut it into length according to computerized instructions for the length necessary in that particular wire run. Therefore, in any one time, coming out of the wire selector, marker and cutter 3, there is a particular kind of wire, i.e. the proper size and type, properly coded and cut to the appropriate length for a particular strand (or multistrand) that is required in the next step of the harness-forming process.

The ink jet marking machine 4 uses a very fine ink jet marker which can apply a serial number identifying the exact destination of the wire in its final harness even on small diameter wires. The ink jet marking system is fairly high speed in operation, and as no quick-dry inks have been found that will adhere under all conditions to all of the coverings with which the wires are provided, a curing period is required for these wires before they are processed further, else the numbers will be rubbed off or smudged. One of the processes undergone by the cartridge of the instant invention is to expose the inked wire to an oven for a period of about thirty minutes to permit the ink to cure.

It is at this point that the instant invention comes into play. Pre-selected, pre-cut, and pre-marked lengths of wire are sequentially presented to the cartridge loader 5, which houses the cartridge of the instant invention. The cartridges are presented to the cartridge loader by a conveyor 6, which receives empty cartridges from the form board after the previous wire has been formed. It is the purpose of the cartridge loader to take an empty cartridge from empty cartridge conveyor 6, and put it out fully loaded onto the loaded cartridge conveyor 7 for further processing. The further processing essentially involves stripping the ends of the wire segment, mounting the proper terminals, and then forming the wire onto the forming board, which draws it off of the rotating reel of the cartridge as it is moved over the board by a gantry robot. These processes will be taken up later, and the loading operation will be detailed at this point.

The cartridge is indicated at 8 and is essentially comprised of three mutually free-wheeling elements: a first half-shell 9, a second half-shell 10, and a reel or spool 11 which is captured between the two half-shells. Although construction need not accord to the details of the instant disclosure, the present embodiment as it is currently deployed is best understood by reference to FIG. 7. The first half-shell 9 has a central crown-shaped flanged member 12 which mounts the half-shell to the central shaft 13. This shaft and the flange are provided with a transverse pin 14 to permit the first half-shell to be rotated by means of the spanner 15, which is part of the cartridge loader 5.

The central shaft extends through the spool 11 and the core bushing 17 which mounts the spool sidewalls, and through the sidewall of the second half-shell 10. The second half-shell 10 is mounted on a central flange 18 which free-wheels on the shaft 13 and is retained by pin and retainer washer 19 and 20. The flange 18 has a sleeve which projects around the shaft into the cartridge, which is spaced by space sleeve 21 from the opposite half-shell.

Thus, at this point there are two half-shells which are freely rotatable about one another, and a central, captured spool which is freely rotatable about the central shaft relative to either one of the half-shells.

Figure 2:
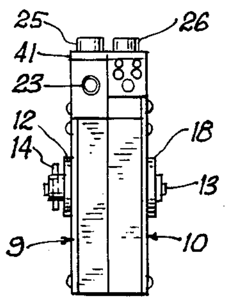
FIG. 2 is a rear elevation view taken from the left side of FIG. 1.
Figure 1:
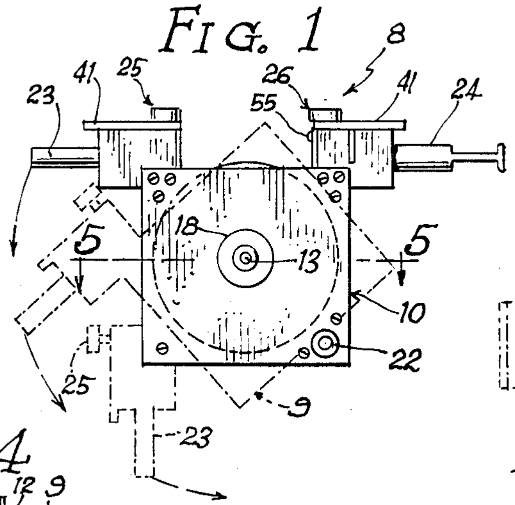
FIG. 1 is a side elevation view of the cartridge showing the rotational action between half-shells in phantom.
Figure 3:
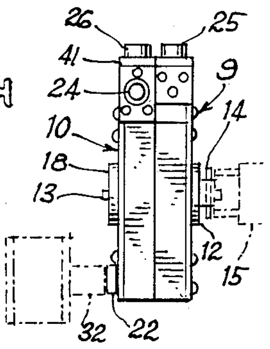
FIG. 3 is a front elevation view taken from the right side of FIG. 1.
Figure 7:
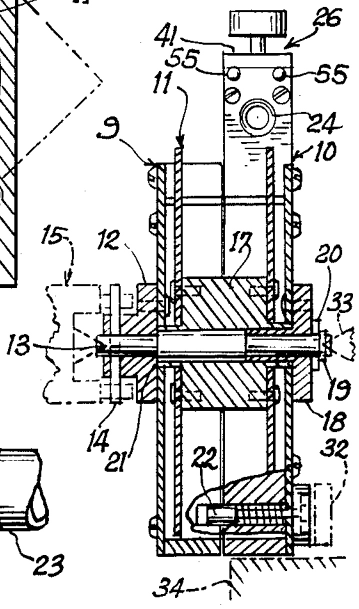
FIG. 7 is a section taken along line 7—7 of FIG. 6.

The two half shells have a home position which is illustrated in solid line in FIG. 1. This home position is established when the spring-loaded locking pin 22 seats in the corresponding socket in the first half-shell 9 as shown in FIG. 7. While this pin is in place, the half-shells are locked together, and the central spool is still freely rotatable about the locked pair which defines the cartridge.

Figure 4:
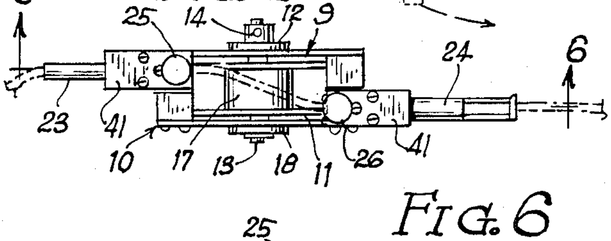
FIG. 4 is a top plan view of the cartridge as seen from the top of FIG. 1.

Each of the half shells mounts a tube, which project on the opposite sides of the cartridge as shown in FIG. 4. The first half shell mounts the trailing end tube 23, which engages the end of the wire which trails as the wire is paid out onto the form board. This tube is substantially tangentially oriented relative to the spool 11, as is the pay-out tube 24, which is mounted on the second half-shell 10. The pay-out tube is more complicated than the trailing end tube as will be explained below.

Both of the tubes have, adjacent their interior end, wire grippers 25 and 26, which can best be understood by reference to FIG. 14, which is a section through the gripper 26. Gripper 25 is identical except for certain structure relating to the pay-out tube shown in FIG. 14.

By means of compression spring 27 and auxilary extension springs 28 which were incorporated in the prototype to increase gripping power, the bored block 29 is pulled downwardly so that it securely grips a wire passing through the bore 30 and also through the trailing end and leading end passageways adjacent the respective tubes. In its normal state, the grippers grip the wires extending through their respective tubes very firmly. This is shown in FIG. 6, wherein, absent the application of any upward pressure on the knobs of the grippers, the wire shown in phantom in that figure is very securely held in place.

Loading of the cartridge in the cartridge loader 5 is accomplished in the following manner. The cartridge loader extends the end of the wire through the pay-out tube 24, across the open space at the top of the cartridge, and then through the trailing end tube 23 as shown in FIG. 4. The wire at this point does not wrap around the spool at all, but more or less defines a straight shot from the pay-out tube through the trailing end tube.

In order that this may be done, the pay-out tube gripper 26 is opened by means of electromagnet 31 which is operative inside the loader under the direction of the computer. As shown in FIG. 14, the magnet opens the gripper to permit insertion of the wire, and holds the gripper 26 in the open position until the wire is fully wound on the spool. The gripper 25 is opened in a similar fashion by a corresponding magnet in the loader. Once the projecting end of the wire has been extended to about two inches beyond the terminus of the trailing end tube 23, the gripper 25 is released to securely engage the end of the wire in this position because when the wire is loaded, the "leading end" of the wire being loaded is engaged in the "trailing end gripper" of the cartridge, terminology confusion results. For this reason, the first end of the wire as it is loaded on the cartridge will be termed "the first loaded end", and the trailing end will be termed the "second loaded end", to resolve the conflict in terminology.

Once the wire is threaded through cartridge as shown in FIG. 4, the lock pin 22 is pulled out by the magnet 32 again part of the loader 5, to permit the freewheeling of the half-shells relative to one another, and relative to the reel. The pay-out tube 24 through which the incoming wire is entrained, and its half-shell are maintained stationary and in position by spindle 33, and an underlying shelf 34 which extends only out across the bottom of the half-shell mounting the pay-out tube as shown in FIG. 7. At this point, the spanner wrench 15 rapidly rotates the pin 14 causing the first half-shell to rotate relative to the second, taking the end of the wire with it around the reel 11 until it is completely wound as shown in FIG. 6. A sensor, not shown, two inches upstream of the pay-out tube tip stops the action of the rotating spanner, and causes release of the gripper 26 to firmly engage the wire in this position. At this point, except in the rare circumstance in which the two half-shells would by happenstance end up in their home position shown in FIG. 1, the first half-shell would be reverse-rotated back into the first home position, and the locking pin 22 released to lock the half-shells in this position. At this point, the spool is fully wound, with both ends of the pre-cut wire extending about two inches from their respective tube, and the cartridge is ready to move on to further processing.

The next step is to cure the wire in the oven 35 for about half an hour so that the ink jet identification markings cure before the wire is further handled. The loader places the loaded cartridge with its oppositely directed tubes 23 and 24 supporting it on a split conveyor 7 with the body of the cartridge depending between the two portions of the split conveyor. The conveyor conveys the cartridge through the oven 35 slowly enough so that there is approximately thirty minutes' exposure to heat of about 300 degrees Fahrenheit. The cartridge is substantially all metallic, and the annular air space permits free circulation about the outer portion of the coil of wire to maximize the even and thorough heating of all of the wire on the spool.

Figure 10:
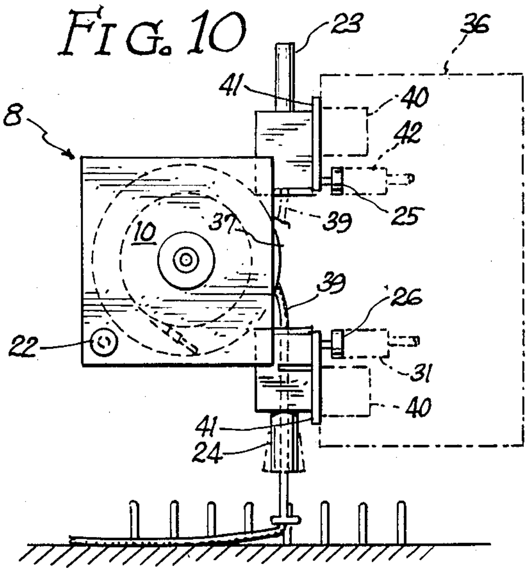
FIG. 10 illustrates the lowered spool of FIG. 9 engaged on the end effector.
Figure 12A:
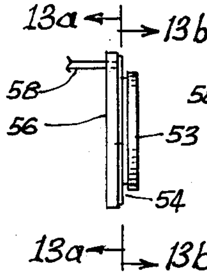
Figure 12B:
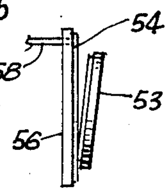

After the cartridge exits the oven, it is ready for the next sequence of steps, which comprise the stripping, termininating, and crimping of the terminals, at the wire ends. To perform these steps, an end effector 36 engages the cartridge, as is best seen in FIG. 10. The end effector has a cylindrical wall portion 37 which fits closely with the circumference of the spool. The spool chamber 38 defined by the housing comprised of the two half-shells, fits the perimeter of the spool equally closely, so that a very small space of a few thousandth of an inch is provided between spool and the chamber 38 which houses it. This close spacing makes it impossible for any wire to get wedged between the reels and the chamber walls. The cylindrical chamber is continuous except for two channels, one of which is indicated at 39, which are necessary to pass the wire onto and off of the reel through the end effector.

The end effector attaches to the cartridge by means of a pair of powerful electromagnets 40 which engage ferro-magnetic plates 41 at the respective ends of the top of the cartridge. Magnetic actuators 42 and 31 control the grippers 25 and 26 respectively. Of course, all the magnets and the functions of the end effector are computer controlled and operate according to a predetermined sequence.

Figure 5:
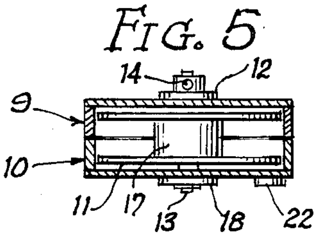
FIG. 5 is a section taken along line 5—5 of FIG. 1.

The end effector, which initially is operated by an articulated robot, brings the cartridge over to first address a stripping machine or stripper as shown as 44 in FIG. 15, and then a terminal applicator and crimper indicator at 45. The strippers and terminal applicators/-crimpers are off-the-shelf items, and ordinarily would be lined up in a row providing the requisite sizes and types of terminals. The computer controls the end effector and inserts the appropriate end of the wire on the cartridge into the correct stripper and terminator. This is done for both ends of the wire, so that the wire comes out with two terminals which are ordinarily of the type illustrated in FIG. 5, or their female counterparts. The cartridge and the robots which implement its use are currently oriented toward an aircraft harness application. In this particular application, the cartridge is first handled with an articulated robot, which essentially performs the tasks thus far described to present the cartridge in loaded, treated form with the wire ready for pay-out. The cartridge is then parked by the articulated robot and picked up by a second, gantry robot for the actual paying out of the wire on the formboard. This particular application is described below. However, it is important to realize that the sequential use of two different robots represents only the one application mode, which is described herein. It is equally feasible to use the cartridge on a single articulated, or gantry robot for the entire cartridge loading and harness forming process.

Additionally, in the aircraft, harness implementation mentioned above, the articulated robot has a permanently mounted end effector because it is dedicated to use with the cartridge. However, the gantry robot has other tasks, and its end effector is thus removable. Thus, a wide variety of different procedural implementations for varied applications is possible using the cartridge of the instant invention. With that in mind, the description below covers the completion of the wire laying process utilizing a gantry robot.

Once both of the ends of the length of wire have been properly terminated, the articulated robot releases the cartridge in a holding area, where it is subsequently picked up by a gantry robot. The gantry robot is responsible for actually threading the segment of wire over the form board. After the first end of the wire is engaged in some kind of a gripping device such as the CuComb TM, shown in FIG. 18, the gripper 25 must be released to permit the wire to freely payout from the spool 11, which is freely rotational within the spool housing. As noted above, the chamber 38 which defines the spool housing is very smooth and defines essentially no gap with the edges of the spool, so that the free terminal at the trailing end of the wire segment will not hang up as it is whipped around and around in the spool chamber.

As shown in FIG. 16, the gantry robot draws the cartridge around the various forming pins according to its pre-programmed instructions, until it reaches the end, which may take the form of several combs 46, with the last comb possibly being backed by a baffle 47 to bend the ends more or less orthogonally to the run of the wire to prevent their escape. This is especially helpful on the first run, when the wire lengths have not yet been calibrated exactly, which is done through feedback from any excessive or inadequate lengths of wire as becomes apparent from the first harness run. Ordinarily, the wires are made slightly overlength so that the first harness can still be used with a little adaptation, and the necessary feedback to provide exact wire sizes can still be fed into the computer for subsequent runs.

Once the gantry robot has completed the run, it places the empty cartridge on the return conveyor 6, to be returned to the loader to start the cycle again.

Another feature of the invention which has not yet been described pertains to the pay-out tube 24, and two special features which first, permit the free paying-out of terminated ends, and the second of which avoids a disaster in case the wire is somehow snagged.

Figure 11:
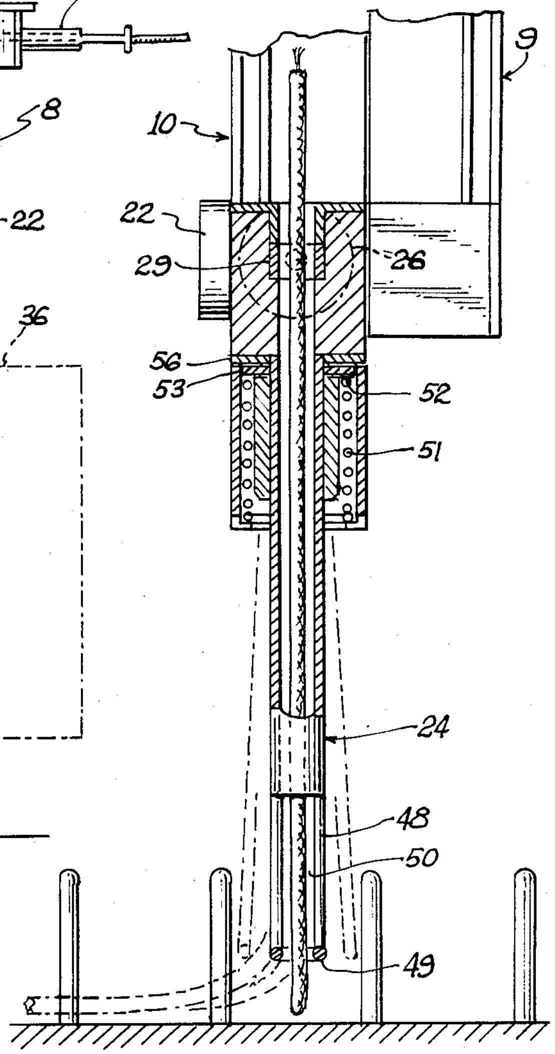
FIG. 11 illustrates the operation of the pay-out tube between form board pins, illustrating the triggering of the release mechanism in phantom.

First, as best seen in FIGS. 1 and 11, the pay-out tube actually terminates in a pair of long rods 48 which mount a polished ring 49 on the ends. The purpose of having the rods rather than a straight tube is to provide open channels 50, which are generally open in the direction of the run of the wire, so that as the rigid trailing terminal passes down through the open end, it is free to flip its trailing tip out through the channel to strike a more oblique angle with the paid-out length than the approximately 90 degrees it would have to bend if the tube were solid rather than having the channels. This has proved very effective, and few if any snags have been caused with this open-channel pay-out tube.

The second feature of the pay-out tube is best shown in FIGS. 11 through 13*b*. The pay-out tube is not rigidly mounted to the cartridge, but has a certain amount of play as shown in phantom in FIG. 11. It is spring-loaded into orthogonal projection by a compression spring 51 which compresses an orthogonal flange 52 mounted to the pay-out tube upwardly as shown in FIG. 11. This flange mounts a ring contact 53 to its topside. The ring contact in turn is in contact, when not deflected, with the spaced contacts 54 on the little printed circuit square 56 which is rigidly mounted to the cartridge. As best shown in FIGS. 12*a* and 12*b*, the ring makes contact with the contacts 54 when the pay-out tube experiences no deflection, and opens the contacts as shown in FIG. 12*b* when there is a deflection.

Figure 8:
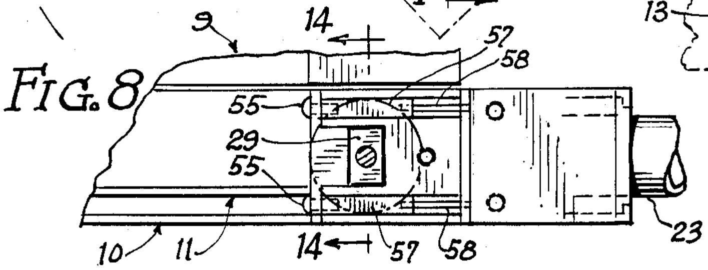
FIG. 8 is a section taken along line 8—8 of FIG. 6.
Figure 9:
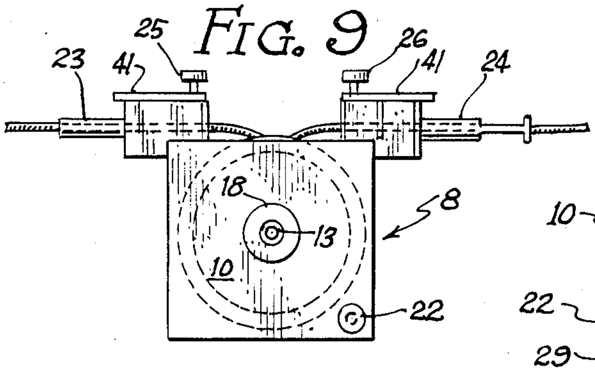
FIG. 9 is a side elevation view similar to that of FIG. 1 but with the length of wire in place on the spool.

The opening of the contacts is made known to a circuit in the end effector through two screw terminals 55 shown in FIGS. 8 and 14. These screws are engaged in an insulator, and screw into little brass bars 57 connected to wires 58 connected to the printed circuit board contact 54. Mating contacts in the end effector meet with the screws 55, and the circuitry is such that the instant the pay-out tube is deflected to open the circuit, the retaining magnets 40 of the end effector are immediately de-energized, dropping the cartridge onto the form board. This does not damage the cartridge, and is the quickest, most foolproof way of ensuring that the cartridge does not continue moving after there has been some snag of a wire, which would possibly cause considerably damage to the delicate, highly accurate mechanism which entrains the wire through the form board 10.

The compression of the spring 51 is great enough to ignore minor snags which are overcome as the cartridge is drawn along. It is sufficiently light however, that a serious snagging problem is immediately reflected in the de-energization of the magnets 40 with the subsequent dropping of the cartridge on to the form board surface.

As thus described and claimed, the instant invention presents a significant advance in the automated harness fabrication art. It is noted that the cartridge and the technique for using it is not specific to any particular harness, but could be used for virtually any harness which is capable of being laid out on a form board. With the improved accuracy of robots and robotics, and increasing sophistication of computer technology, the instant cartridge and the method for using it should prove an ideal and universal interface between the computer driven robot arm, and the wire and form board upon which it operates.

I claim:

1. A method for performing at least in part the preparation of wire for harness forming and the actual forming thereof, utilizing a wire spool cartridge with a leading end gripper which is rotatable about the axis of said spool to wind a wire thereon, said method comprising the following steps:

(a) with a wire loader, engaging the first loaded end of a length of wire in said leading end gripper;

(b) with said loader, spinning said gripper around the axis of said spool until said length of wire is substantially wrapped onto said spool.

2. A method according to claim 1 and including a trailing end gripper and including a trailing end tube adjacent and trailing end gripper, said cartridge has a payout tube just ahead of said trailing end gripper, and including the step of locking said trailing end gripper on the trailing end of a wire being loaded when the trailing end itself approaches within on the order of two inches of trailing end tube.

3. A method according to claim 2 wherein said grippers lock wires therein with on the order of two inches of wire extending externally of each of said tubes as projecting ends, and including the further step of inserting both projecting wire ends sequentially into a wire stripper.

4. A method according to claim 3 and including a further step of inserting both of said projecting ends sequentially into a wire terminator and crimper.

5. A method according to claim 4 and further including the step of addressing a wire tester with said cartridge and testing the physical and electrical integrity of the ends of the wire thereon.

6. A method according to claim 1 wherein the locking of said gripper is effected by the magnetic operator of an end effector engaged on said cartridge, and including the further step of engaging said end effector, while it engages said cartridge, by a gantry-mounted robot and drawing said cartridge over a form board in a predetermined pattern to draw said pay-out tube around predetermined forming pins to lay a wire in a predetermined locus.

* * * * *